United States Patent
Konetski et al.

(10) Patent No.: US 7,975,023 B2
(45) Date of Patent: Jul. 5, 2011

(54) SYSTEM AND METHOD FOR USING RESOURCES OF A COMPUTER SYSTEM IN CONJUNCTION WITH A THIN MEDIA CLIENT

(75) Inventors: David Konetski, Austin, TX (US); Shannon Christopher Boesch, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 1872 days.

(21) Appl. No.: 09/771,095

(22) Filed: Jan. 26, 2001

(65) Prior Publication Data

US 2002/0103880 A1 Aug. 1, 2002

(51) Int. Cl.
*G06F 15/16* (2006.01)

(52) U.S. Cl. ........ 709/218; 709/217; 709/219; 709/231; 713/168

(58) Field of Classification Search ............... 709/218, 709/217, 247, 203, 219; 713/168; 710/52; 725/39, 87, 91, 92, 94, 38; 707/104.1
See application file for complete search history.

(56) References Cited

U.S. PATENT DOCUMENTS

| | | | |
|---|---|---|---|
| 5,642,171 A | 6/1997 | Baumgartner et al. | |
| 5,896,493 A | 4/1999 | Rao | |
| 5,996,022 A * | 11/1999 | Krueger et al. | 709/247 |
| 6,006,332 A * | 12/1999 | Rabne et al. | 726/6 |
| 6,253,237 B1 * | 6/2001 | Story et al. | 709/217 |
| 6,697,944 B1 * | 2/2004 | Jones et al. | 713/168 |
| 6,769,127 B1 * | 7/2004 | Bonomi et al. | 725/39 |
| 6,987,221 B2 * | 1/2006 | Platt | 84/601 |
| 7,073,199 B1 * | 7/2006 | Raley | 726/26 |
| 2002/0032905 A1 * | 3/2002 | Sherr et al. | 725/38 |
| 2004/0193648 A1 * | 9/2004 | Lai et al. | 707/104.1 |

* cited by examiner

*Primary Examiner* — Yves Dalencourt
(74) *Attorney, Agent, or Firm* — Haynes and Boone, LLP

(57) ABSTRACT

A computer system including a processor and a memory for retrieving digital media content, storing the digital media content in the memory, and providing the digital media content to a thin media client is provided.

23 Claims, 2 Drawing Sheets

SYSTEM AND METHOD FOR USING RESOURCES OF A COMPUTER SYSTEM IN CONJUNCTION WITH A THIN MEDIA CLIENT

BACKGROUND

The disclosures herein relate generally to computer systems and more particularly to a system and method for using resources of a computer system in conjunction with a thin media client.

Media clients such as audio, video, and image devices are designed to perform a specialized function using digital media content downloaded from computer networks such as the Internet. To handle digital media content downloaded from the Internet or other local input devices such as a USB device or a CD-ROM, the media clients generally require significant amounts of memory, local storage, and processing power. For example, media clients that use realtime information such as streaming video or audio include enough memory to buffer realtime information to attempt to overcome streaming problems related to dropped packets and random transmission delays. The larger the buffer, the less likely that a user will experience delays when accessing the realtime information. Unfortunately, increasing the size of the buffer increases the cost and complexity of a media client. Similarly, increased storage or processing requirements needed for realtime information or other types of digital media content increase the cost and complexity of a media client.

It would be desirable to reduce the cost and complexity of media clients in a home network. Therefore, what is needed is a system and method for using resources of a computer system in conjunction with a thin media client.

SUMMARY

One embodiment, accordingly, provides a computer system including a processor and a memory for retrieving digital media content, storing the digital media content in the memory, and providing the digital media content to a thin media client.

A principal advantage of this embodiment is that it allows a thin media client to use the resources of a computer system in a home network. The cost and complexity of the thin media client is reduced by having the computer system perform many of the processing and storage functions of the media client. In addition, resources of the computer system not normally found in a media client may enhance the features of the media client.

DETAILED DESCRIPTION

Figure 1:
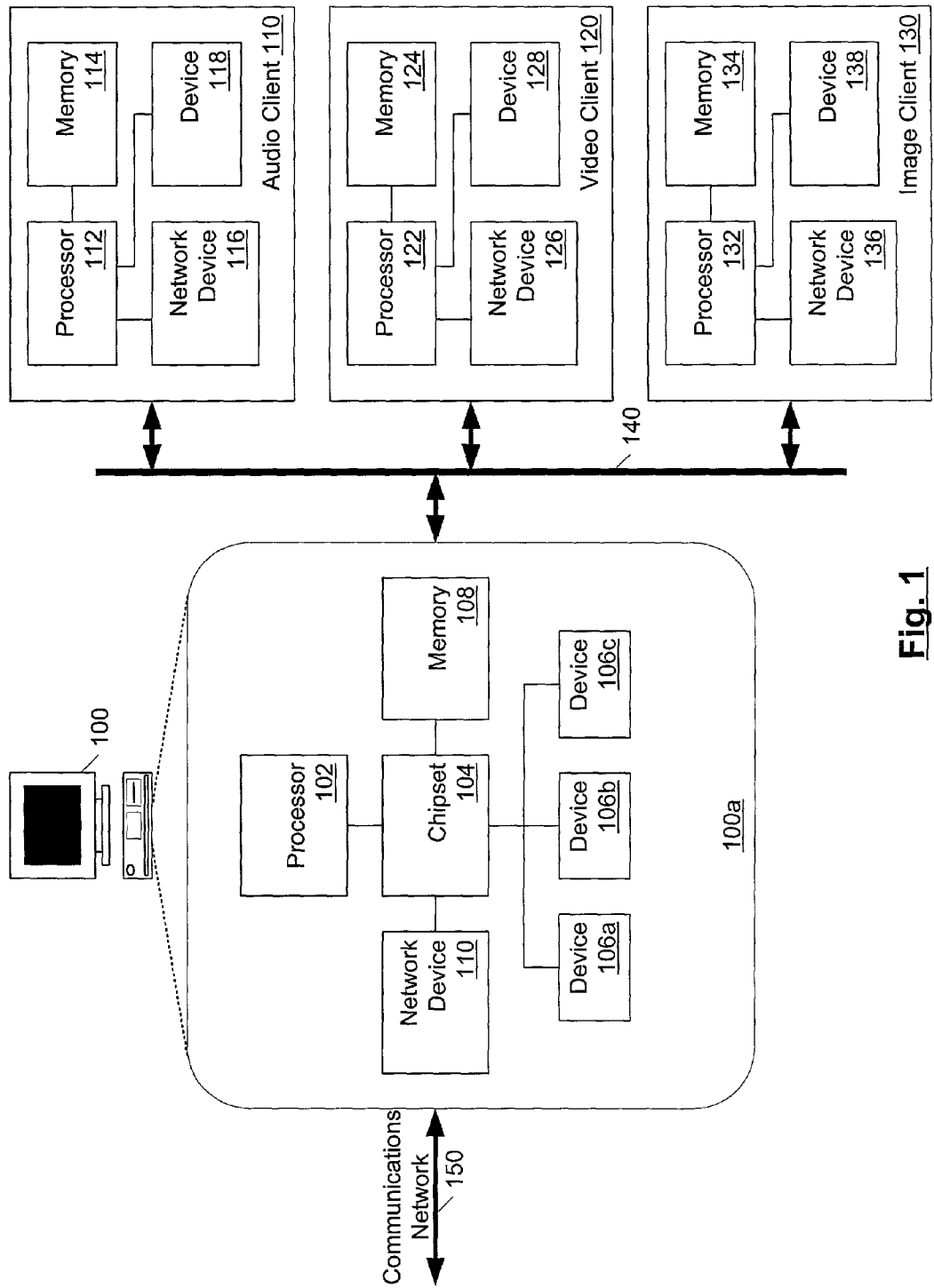
FIG. 1 is a diagram illustrating an embodiment of a computer system configured to communicate with a plurality of thin media clients.

FIG. 1 is a diagram illustrating an embodiment of a computer system 100 configured to communicate with a plurality of thin media clients 110, 120 and 130.

As shown in an expanded view 100*a*, computer system 100 includes a processor 102, a chipset 104, a plurality of devices 106*a*, 106*b*, and 106*c*, a memory 108, and a network device 110. Audio client 110 includes a processor 112, a memory 114, a network device 116, and at least one device 118. Video client 120 includes a processor 122, a memory 124, a network device 126, and at least one device 128. Image client 130 includes a processor 132, a memory 134, a network device 136, and at least one device 138.

Computer system 100 is configured to communicate with other computing or storage devices using network device 110 and communications network 150. Network device 110 may be any suitable device such as a modem or NIC that allows computer system 100 to communicate using communications network 150. Communications network 150 may be any suitable wired or wireless network such as a global communications network, e.g. the Internet, or an intranet. Computer system 100 is also configured to communicate with thin media clients 110, 120, and 130 using network 140. Network 140 may be any suitable wired or wireless network. Network 140 may include Ethernet, home phone network alliance (HPNA), 802.11, or bluetooth components. In one embodiment, computer system 100 communicates with thin media clients 110, 120, and 130 over network 140 using the TCP/IP protocol. In other embodiments, computer system 100 communicates with the thin media clients 110, 120, and 130 using other protocols.

In FIG. 1, audio client 110, video client 120, and image client 130 are thin media clients. As used herein, the term thin media client refers to a device that is configured to perform one or more functions using digital media content and is configured to leverage the processing, storage, and buffering capabilities of a computer system. As used herein, the term digital media content refers to media information, such as any audio, video, still image or other graphical information or any combination of these media types, that is stored or transmitted in a digital format. Digital media content may be a discrete file that includes media information or may be a continuous stream, realtime or otherwise, of media information.

The components of audio client 110, video client 120, and image client 130, particularly processors 112, 122, and 132 and memories 114, 124, and 134, respectively, are designed to provide these thin media clients with a minimal level of processing, storage, and buffering capability. The bulk of the processing, storage, and buffering needs of audio client 110, video client 120, and image client 130 are provided by computer system 100 as will be described in more detail below.

Computer system 100 may be any type of wired or wireless computing device that is configured to provide services to thin media clients and communicate with other computer systems using communications network 150. For example, computer system 100 may be a personal computer, a server computer, or a laptop computer.

Computer system 100 is configured to perform processing, storage, and/or buffering functions for thin media clients 110, 120, and 130. Computer system 100 retrieves digital media content for thin media clients 110, 120, and 130 using communications network 150 or a local input device such as a USB device or CD-ROM. Computer system 100 may retrieve this content in response to a user input at a thin media client 110, 120, or 130 or at an input device of computer system 100. A thin media client 110, 120, or 130 and/or computer system 100 may be configured to provide the user with a user interface to allow the user to select digital media content to be downloaded. The user interface may be a standard Internet browser or other user interface that allows the user to select digital media content. Computer system 100 may also retrieve this content in response to a signal generated by software at either a thin media client 110, 120, or 130 or computer system 100. The signal may be generated according to criteria specified by a user such as to periodically download a digital media file.

Computer system 100 is configured to perform processing functions on digital media content. The particular processing functions performed may vary according to the type of digital media content. Examples of processing functions performed by computer system 100 include transcoding, digital rights management, decompression, and decryption of digital media content. These processing functions may be performed after the digital media content is downloaded or during the process of downloading the digital media content by computer system 100.

Transcoding refers to the process of converting digital media content from one form to another. This process may include converting digital media content from one predefined format to a second predefined format. The transcoding of digital media content allows computer system 100 to provide a thin media client 110, 120, or 130 with digital media content appropriate for the particular client. For example, digital media content may be downloaded in a format that is not supported by a particular client. In this case, computer system 100 transcodes the digital media content into a format that is supported by the particular client. As another example, certain digital media content may be downloaded in a high quality video or audio format. Here, computer system 100 may transcode the high quality video or audio digital media content into a lower quality video or audio format for use by a lower performance client. By transcoding digital media content, computer system 100 handles a processing task that may otherwise be handled by thin media client 110, 120, or 130.

Computer system 100 may be configured to perform digital rights management for proprietary digital media content. Certain digital media content may be available only to select users, i.e. authorized users, who have paid a use or subscription fee, e.g. pay per view or pay per listen, for the content. A digital rights system ensures that only authorized users are able to access proprietary digital media content. Computer system 100 performs processing tasks to implement a digital rights system. These tasks may vary between different digital rights systems. By performing these digital rights tasks, computer system 100 handles processing tasks that may otherwise be handled by thin media client 110, 120, or 130.

In addition, computer system 100 may be configured to decompress and decrypt digital media content. Certain digital media content may be downloaded in a compressed or encrypted form. Computer system 100 is configured to detect compressed and encrypted digital media content and decompress or decrypt the digital media content. By performing these decompression and decryption tasks, computer system 100 handles processing tasks that may otherwise be handled by thin media client 110, 120, or 130.

Computer system 100 may be configured to buffer digital media content. Computer system 100 is configured to temporarily store digital media content in memory 108 prior to providing the digital media content to thin media client 110, 120, or 130. In this way, large amounts of a digital media file or a continuous stream of digital media information are stored on computer system 100 and provided to thin media client 110, 120, or 130 as needed by performance demands or permitted by memory size constraints on the client. By buffering digital media content, the memory resources on thin media clients 110, 120, and 130 may be reduced.

Computer system 100 is further configured to store digital media content on a longer term basis in memory 108. For example, digital media files such as audio files for use with audio client 110 may be downloaded and stored on computer system 100. As a result, these files may be accessed from computer system 100 repeatedly by audio client 110. By storing digital media content on computer system 100, the memory resources on thin media clients 110, 120, and 130 may be reduced.

Computer system 100 is configured to provide user interfaces associated with thin media clients 110, 120, and 130 to a user. The user interfaces may provide the user with the ability to operate one or more features of the clients or may provide enhanced features associated with the clients. For example, a user interface may allow a user to set preferences associated with a client, create playlists of stored digital media content, manage a favorites list of digital media content, manage the amount of digital media content stored on computer system 100, select digital media content to be retrieved, or otherwise organize digital media content. By providing user interfaces associated with thin media clients 110, 120, and 130, computer system 100 may enhance or complement the features of the clients in addition to possibly reducing the amount resources of the clients.

The above uses of computer system 100 provide examples of how the resources of computer system 100 may be used by thin media clients 110, 120, and 130 to allow the clients to avoid including redundant resources. Other examples where thin media clients 110, 120, and 130 leverage other resources of computer system 100 are possible and contemplated. The functions and operations of three example thin media clients, audio client 110, video client 120, and image client 130, will now be discussed. It is understood, however, that other types of thin media clients that perform other media functions may be configured to use the resources of computer system 100.

Audio client 110 is configured to play audio from digital media content. Processor 112, memory 114, and network device 116 provide audio client 110 with the ability to operate and communicate with computer system 100 to retrieve digital audio content. In audio client 110, device 118 may be any audio device such as speakers or headphones capable of producing audio and may be located externally or separate from audio client 110. Audio client 110 may be configured to play digital audio files or realtime digital audio information. The files or information may be buffered or stored by computer system 100 and may be of any format such as MP3, Windows Media Audio (WMA), Real Networks G2 or Direct Show compliant formats. Computer system 100 may be configured to transcode the audio files or information before providing the files or information to audio client 110. Computer system 100 may be configured to decompress or decrypt audio files or information prior to providing the files or information audio client 110. For Direct Show files in particular, computer system 100 may invoke codecs supported by the Direct Show architecture to perform tasks on the audio files or information prior to providing the files or information to audio client 110. Computer system 100 may also strip away decryption associated with a digital rights management system or perform other digital rights management tasks on the audio files or information prior to providing the files or information to audio client 110. A user interface provided by computer system 100 may allow a user to create playlists or songlists for use by audio client 110.

Video client 120 is configured to play video from digital media content. Processor 122, memory 124, and network device 126 provide video client 120 with the ability to operate and communicate with computer system 100 to retrieve digital video content. In video client 120, device 128 may be any video device such as a display screen capable of displaying video and may be located externally or separate from video client 120. Video client 120 may be configured to play digital video files or realtime digital video information. The files or information may be buffered or stored by computer system 100 and may be of any format such as MPEG1, MPEG2, MPEG4, AVI, Quicktime, Real Video, and Windows Media Video (WMV). Computer system 100 may be configured to transcode the video files or information before providing the files or information to video client 120. Computer system 100 may be configured to decompress or decrypt video files or information prior to providing the files or information to video client 120. Computer system 100 may invoke codecs supported by a particular architecture to perform tasks on the video files or information prior to providing the files or information to video client 120. Computer system 100 may also strip away decryption associated with a digital rights management system or perform other digital rights management tasks on the video files or information prior to providing the files or information to video client 120. A user interface provided by computer system 100 may allow a user to create video playlists for use by video client 120.

Image client 130 is configured to display images or graphics from digital media content. Processor 132, memory 134, and network device 136 provide image client 130 with the ability to operate and communicate with computer system 100 to retrieve digital image content. In image client 130, device 138 may be any image or graphics device such as a display screen capable of displaying images or graphics and may be located externally or separate from image client 130. Image client 130 may be configured to play digital video files or digital video information. The files or information may be buffered or stored by computer system 100 and may be of any format such as JPEG, GIF, TIFF, and BMP. Computer system 100 may be configured to transcode the image files or information before providing the files or information to image client 130. Computer system 100 may be configured to decompress or decrypt image files or information prior to providing the files or information image client 130. Computer system 100 may invoke codecs supported by a particular image architecture to perform tasks on the image files or information prior to providing the files or information to image client 130. Computer system 100 may also strip away decryption associated with a digital rights management system or perform other digital rights management tasks on the image files or information prior to providing the files or information to image client 130. A user interface provided by computer system 100 may allow a user to manage images for use by image client 130.

In other embodiments, multiple thin media clients that perform similar or identical functions may be added to the system shown in FIG. 1. These thin media clients may be located in different rooms in a home network, for example, and may further leverage the resources of computer system 100 by allowing digital media content handled by computer system 100 to be used with multiple thin clients.

Figure 2:
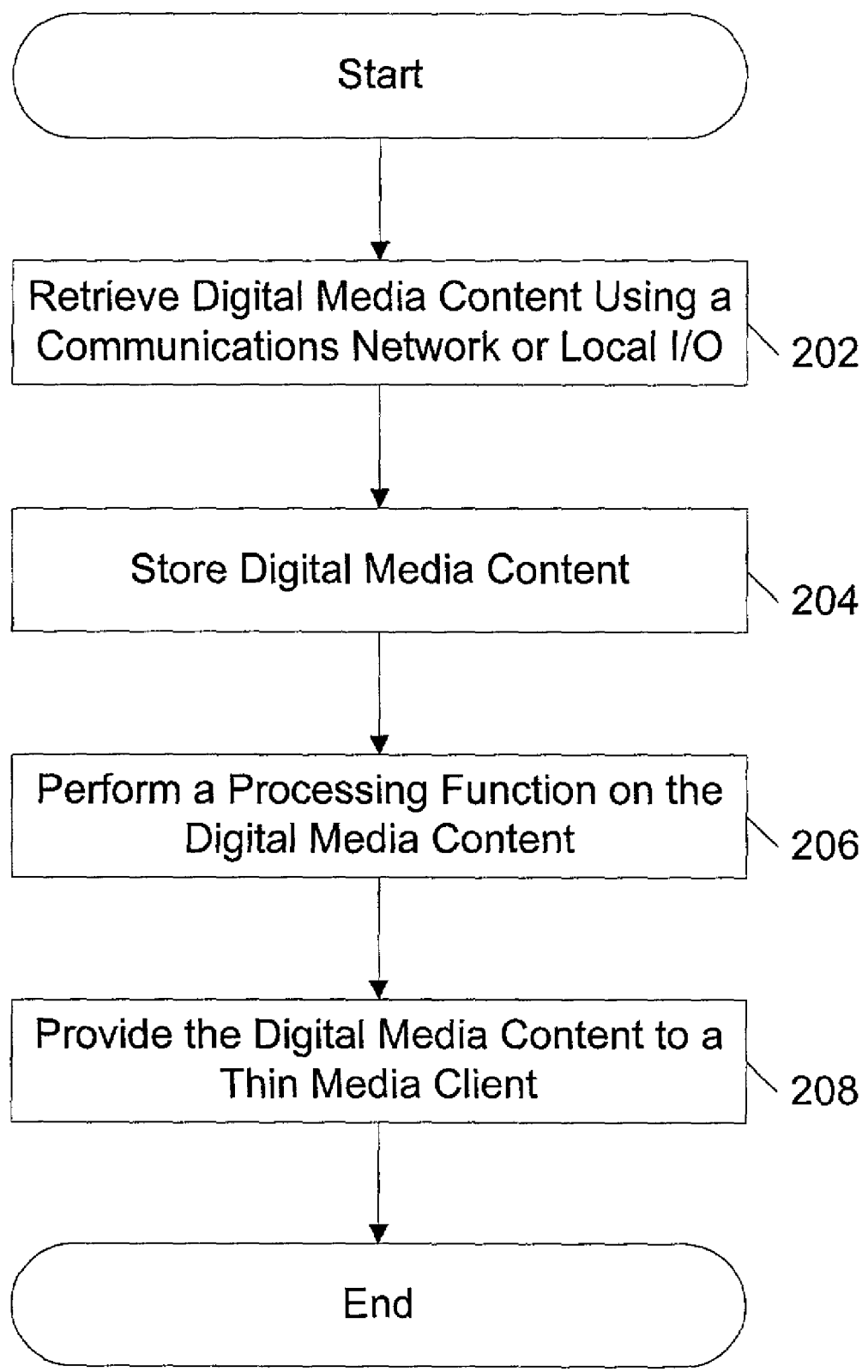
FIG. 2 is a flowchart illustrating an embodiment of a method for using resources of a computer system in conjunction with a thin media client.

FIG. 2 is a flowchart illustrating an embodiment of a method for using resources of a computer system in conjunction with a thin media client. In the embodiment of FIG. 2, digital media content is retrieved by a computer system for use with a thin media client using a communications network or local input/output (I/O) device such as a USB device or CD-ROM as indicated in step 202. The digital media content is stored on the computer system as indicated in step 204. The digital media content may be stored permanently or temporarily on the computer system as determined by characteristics of the thin media client and/or a user selection. A processing function is performed on the digital media content as indicated in step 206. The processing function may include decompressing the digital media content, decrypting the digital media content, performing a rights management function associated with the digital media content, transcoding the digital media content, or any other processing operation associated with the digital media content. In certain cases, step 206 may be omitted where no additional processing of the digital media content is needed. The digital media content is provided to the thin media client as indicated in step 208.

As can be seen, the principal advantages of these embodiments are that they allow a thin media client to use the resources of a computer system in a home network. The cost and complexity of the thin media client is reduced by having the computer system perform many of the processing and storage functions of the media client. In addition, resources of the computer system not normally found in a media client may enhance the features of the media client.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A personal computer comprising a processor and a memory for:
   retrieving digital media content from a content provider, wherein the retrieving is performed by a processor of a personal computer;
   performing a digital rights management function associated with an authorized user resulting in authorized digital media content, wherein the digital rights management function is performed by the processor of the personal computer;
   storing the authorized digital media content in a memory of the personal computer; and
   providing the authorized digital media content via a user interface to a thin media client without performing a digital rights management function on the thin media client, wherein the providing is performed by the personal computer, and wherein the thin media client comprises an input/output (IO) device coupled to the personal computer.

2. The personal computer of claim 1, wherein the personal computer comprises a laptop computer.

3. The personal computer of claim 1, wherein the content provider comprises a server reachable by the personal computer over a network.

4. The personal computer of claim 1, wherein the content provider comprises a local input device.

5. The personal computer of claim 1, wherein the content provider comprises a USB device.

6. The personal computer of claim 1, wherein the content provider comprises a CD-ROM.

7. The personal computer of claim 1, wherein the user interface allows the personal computer to provide the authorized digital media content to the thin media client using Bluetooth technology.

8. The personal computer of claim 1, wherein the thin media client comprises an audio client.

9. The personal computer of claim 8, wherein the digital media content comprises an audio file.

10. The personal computer of claim 8, wherein the digital media content comprises realtime audio information.

11. The personal computer of claim 1, wherein the thin media client comprises a video client, and wherein the digital media content comprises video information.

12. The personal computer of claim 1, wherein the thin media client comprises an image client, and wherein the digital media content comprises image information.

13. A personal computer comprising a processor and a memory for:
- retrieving digital media content from a content provider, wherein the retrieving is performed by a processor of the personal computer;
- selecting via a user interface organization functions to be performed on the digital media content, wherein the user interface is provided by the personal computer;
- performing the organization functions on the digital media content resulting in organized digital media content, wherein the organization functions are performed by the processor of the personal computer;
- storing the organized digital media content in a memory of the personal computer; and
- providing the organized digital media content via the user interface to a thin media client, wherein the providing is performed by the personal computer, and wherein the thin media client comprises an input/output (IO) device coupled to the personal computer.

14. The personal computer of claim 13, wherein the organization functions allow a user to set preferences associated with a client.

15. The personal computer of claim 13, wherein the organization functions allow a user to create playlists of stored organized digital media content.

16. The personal computer of claim 13, wherein the organization functions allow a user to manage a favorites list of organized digital media content.

17. The personal computer of claim 13, wherein the organization functions allow a user to manage the amount of organized digital media content stored on the personal computer.

18. The personal computer of claim 13, wherein the organization functions allow a user to select digital media content to be retrieved.

19. A method performed by a personal computer comprising:
- retrieving digital media content from a content provider, wherein the retrieving is performed by a processor of the personal computer;
- performing a digital rights management function associated with an authorized user resulting in authorized digital media content, wherein the digital rights management function is performed by the processor of the personal computer;
- storing the authorized digital media content in a memory of the personal computer; and
- providing the authorized digital media content via a user interface to a thin media client without performing a digital rights management function on the thin media client, wherein the providing the authorized digital media content is performed by the personal computer, and wherein the thin media client comprises an input/output (IO) device coupled to the personal computer.

20. The method of claim 19, wherein the personal computer comprises a laptop computer.

21. The method of claim 19, wherein the content provider comprises a server.

22. The method of claim 19, wherein the content provider comprises a local input device.

23. The method of claim 19, further comprising:
- selecting via the user interface organization functions to be performed on the authorized digital media content;
- performing the organization functions on the authorized digital media content resulting in organized authorized digital media content; and
- providing the organized authorized digital media content via the user interface to the thin media client.

* * * * *